United States Patent [19]
Gauger

[11] Patent Number: 5,470,462
[45] Date of Patent: Nov. 28, 1995

[54] APPARATUS FOR PREVENTING SCALE FORMATION IN WATER SYSTEMS

[76] Inventor: Raymond G. Gauger, 2130-4 S. Ritchey St., Santa Ana, Calif. 92705

[21] Appl. No.: 967,731

[22] Filed: Nov. 5, 1992

[51] Int. Cl.$^6$ .................................................. B01D 15/00
[52] U.S. Cl. ..................... 210/198.1; 210/696; 210/501; 204/148; 204/197; 366/337; 366/338
[58] Field of Search ................... 210/198.1, 696, 210/501; 366/336, 337, 338, 339; 204/148, 197

[56] References Cited

U.S. PATENT DOCUMENTS

| | | | |
|---|---|---|---|
| 3,051,453 | 8/1962 | Sluijters | 366/337 |
| 3,448,034 | 6/1969 | Craft et al. | 204/197 |
| 3,486,999 | 12/1969 | Craft | 204/197 |
| 3,835,015 | 9/1974 | Gary | 204/197 |
| 3,860,094 | 1/1975 | Breton | 188/24 |
| 3,919,068 | 11/1975 | Gary | 204/197 |
| 3,974,071 | 8/1976 | Dunn et al. | 210/198.1 |
| 4,029,181 | 6/1977 | Lewis | 188/73.1 |
| 4,063,333 | 12/1977 | Schweitzer | 24/137 A |
| 4,135,606 | 1/1979 | Lewis | 188/73.1 |
| 4,179,222 | 12/1979 | Strom et al. | 366/337 |
| 4,230,208 | 10/1980 | Gale | 188/73.1 |
| 5,064,027 | 11/1991 | Akamatsu | 188/73.1 |

Primary Examiner—Robert A. Dawson
Assistant Examiner—Robert James Popovics
Attorney, Agent, or Firm—Edward E. Roberts

[57] ABSTRACT

Water conditioning apparatus including a housing adapted for connection into a fluid delivery system, the housing having a fluid flow chamber with aligned entrance and exit openings, the chamber having an inner generally tubular surface with inwardly directed spirally oriented flow control ribs and a unitary member coaxially arranged therein, the member having an axial length less than the length of the inner chamber. The chamber includes at least one water return scoop in the form of an annular V-shaped groove formed within the chamber about the exit opening. The surface of the unitary member is configured with undulate fin sections, with the fin sections cooperating with the spirally oriented ribs to promote turbulence of the fluid passing therethrough. The water return scoop further assists in the process by causing about one third of all water passing through the chamber to feed back into the chamber for greater turbulence. The parts are configured, dimensioned and arranged so that the combined effect is to promote turbulence in the fluid flow form the exit end and downstream within the fluid flow delivery system to prevent the formation of scale in the conduit. The housing and unitary member are both metallic and formed of a composition of approximately two-third copper with the balance being zinc, nickel and tin.

31 Claims, 2 Drawing Sheets

APPARATUS FOR PREVENTING SCALE FORMATION IN WATER SYSTEMS

BACKGROUND OF THE INVENTION

The background of the invention will be discussed in two parts:

1. Field of the Invention

This invention relates to water conditioning apparatus for preventing scale formation on the interior of conduits through which fluid, such as water, flows, and more particularly to a housing having a unitary turbulence creating member therein for placing in fluid flow relation with a fluid flow system for promoting turbulence a fluid passing therethrough.

2. Description of Prior Art

With fluid, such as water, flowing through conduits, such as pipes, there is a tendency for formation of deposits and scale on the interior of the conduit, which decreases the opening through which the fluid passes, and additionally promotes deterioration of the interior conduit. This is particularly true in water systems, where the source of the water is a municipal water supply which contains a number of elements such as lime and calcium deposits, along with iron and other such material. A number of devices and apparatus have been developed to provide some form of fluid stabilization or conditioning with the device "in-line" with the fluid flow. One such device is shown and described in U.S. Pat. No. 3,448,034, entitled "Fluid Stabilizer" issued Jun. 3, 1969 to Craft et al. The apparatus of this patent is directed to a rod or core adapted to be enclosed within a flow tube, the rod being composed of a plurality of crystalline nonferrous metals having a polarizing effect on the liquids.

Another such device is shown and described in U.S. Pat. No. 3,486,999, entitled "Apparatus for Preventing Scale Formation in Water Systems", issued Dec. 30, 1969 to Craft, the system incorporating an anodic core of self-sacrificing crystalline material which decomposes over a long period of time while setting up polarization of the water, while eliminating the precipitation of salts therefrom.

U.S. Pat. No. 3,835,015, entitled "System Stabilizer", issued Sep. 10, 1974 to Gary shows another device, which is a fluid stabilizing rod of a specific metallurgical composition and configuration, the rod being generally triangular in cross-section. A modification of this device is shown in a continuation-in-part application, issuing into U.S. Pat. No. 3,919,068 on Nov. 11, 1975 to Gary, the rod in this patent being formed by three elongated generally planar members held in triangular relation within the conduit.

Another such device is shown and described in U.S. Pat. No. 3 974,071 entitled "Water Conditioning Device", issued Aug. 10, 1976 to Dunn et al, the device of this patent being a spirally twisted strip of corrosion and lime scale inhibiting copper-nickel alloy contained within a cylindrical casing for churning water as it passes through the casing for more complete contact of the water with the surfaces of the strip.

Such prior art devices rely heavily on the composition of the rod or device "in-line" with fluid flow, with some devices being reactive with the fluid, and others non-reactive.

It is an object of the present invention to provide a new and improved water conditioning apparatus for preventing scale formation and inhibiting growth of fungus and algae.

It is another object of the present invention to provide a new and improved water conditioning apparatus for promoting turbulence of fluid passing therethrough for preventing scale formation inhibiting growth of fungus and algae.

It is further object of the present invention to provide a new and improved water conditioning device for placing in-line with the fluid delivery system and having a housing with an inner chamber with a surface with rib means and an insert formed as a unitary member and using a venturi effect to promote turbulence in fluid passing therethrough to thereby rearrange the molecular structure of particles in suspension and wherein nothing is added or removed from the fluid and there is no loss in pressure on either end of the member.

SUMMARY OF THE INVENTION

The foregoing and other objects of the invention are accomplished by providing a water conditioning apparatus including a housing adapted for connection into the fluid delivery system, the housing having a fluid flow chamber with aligned entrance and exit openings, the chamber having an inner generally tubular surface with inwardly directed spirally oriented ribs and a unitary member coaxially arranged therein, the member having an axial length less than the length of the inner chamber. The chamber includes at least one water return scoop in the form of an annular V-shaped groove formed within the chamber about the exit opening. The surface of the unitary member is configured with undulate fin sections, with the fin sections cooperating with the spirally oriented ribs to promote turbulence of the fluid passing therethrough. The water return scoop further assists in the process by causing about on-third of all water passing through the camber to feed back into the chamber for greater turbulence. The parts are configured, dimensioned and arranged so that the combined effect is to promote turbulence in the fluid flow from the exit end and downstream within the fluid flow delivery system to prevent the formation of scale in the conduit. The housing and the unitary member are both metallic and formed of a composition of approximately two-third copper with the balance being zinc, nickel and tin.

Other objects, features and advantages of the invention will become apparent from a reading of the specification when taken in conjunction with the drawings, in which like reference numerals refer to like elements in the several views.

DESCRIPTION OF THE PREFERRED EMBODIMENTS

Figure 1:
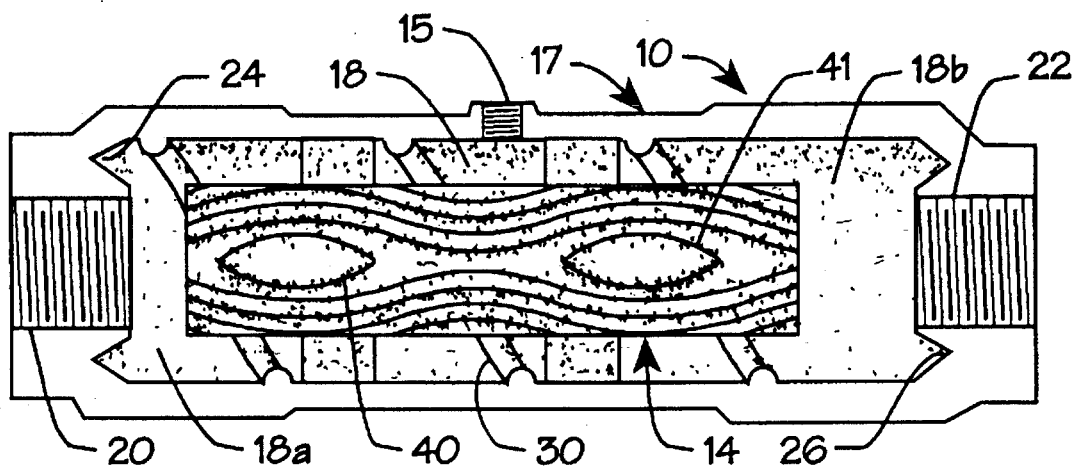
FIG. 1 is a cross-sectional side view of the water conditioning apparatus according to the invention.
Figure 2:
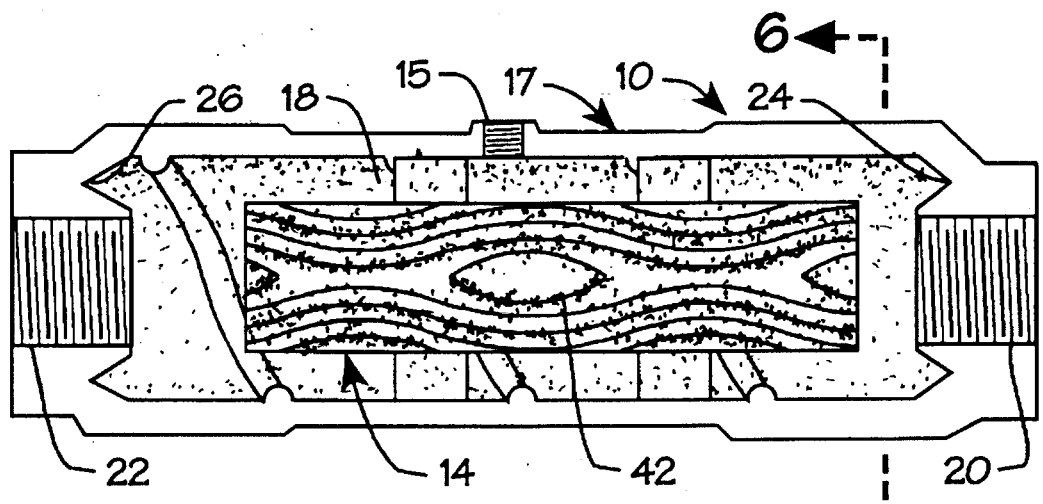
FIG. 2 is a cross-section view of the opposite side of the water conditioning apparatus of FIG. 1.
Figure 3:
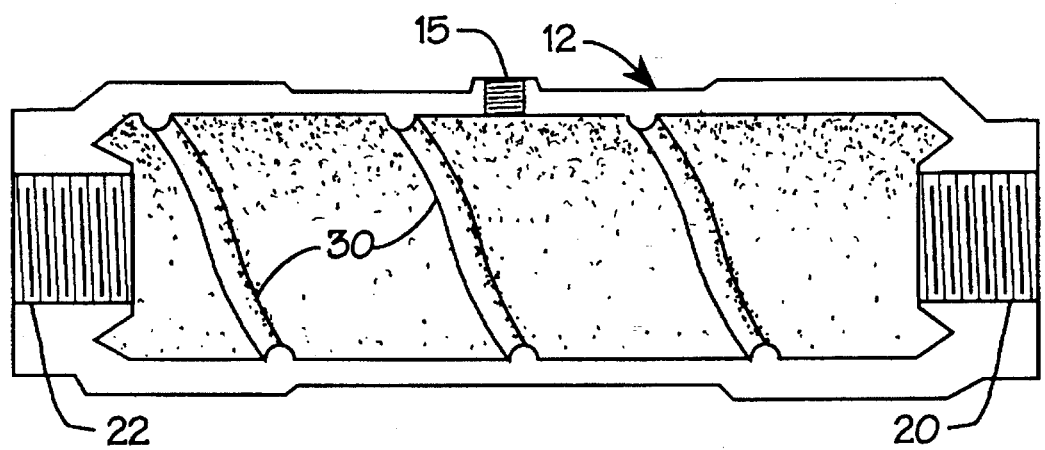
FIG. 3 is a cross-sectional side view of the housing of the water conditioning apparatus of FIG. 1.

Referring now to the drawings, and particularly to FIGS. 1 through 3, there is shown a first embodiment of a water conditioning apparatus, generally designated 10, according to the invention, the apparatus 10 including a housing member, generally designated 12, configured, dimensioned and arranged for receiving therein a substantially imperforate unitary metallic alloy member 14. The housing 12 is generally tubular and formed with an inner chamber 18 having a surface of generally tubular configuration. The opposite end of the housing 12 are provided with a threaded entrance opening 20 and a threaded exit opening 22.

The outer diameter of the housing is greater than the inner diameter of the chamber, which is greater than the inner diameter of the two openings 20 and 22 which are the same diameter. Formed on the interior of the chamber 18 about the entrance and exit openings are first and second water return or feedback scoops formed as opposing generally V-shaped annular grooves 24 and 26, respectively. Consequently, as can be seen the inner chamber 18 is enlarged relative to the openings 20 and 22, and is formed of a generally uniform diameter in the distance between the grooves 24 and 26.

The inner surface of the housing chamber 18 is provided with rib means, in the form of a continuous spiral rib 30 of a plurality of spiral rib segments of a uniform pitch and spacing covering the majority of the length of the inner chamber 18, or at least a distance generally equal to the length of the unitary insert member 14. The orientation of the spiral ribs is such that, with respect to the entrance to exit direction, the water flowing therethrough is directed to generate a left-hand or counterclockwise vortex.

The center portion of the housing wall is provided with a tapped or threaded opening 15 for receiving a threaded plug member (not shown) which serves a threefold purpose, these being to serve as a vent to release gases during the foundry pour, to serve as a clean out for internal cleaning, if necessary, and to serve as a tapped plug for an earth ground wire, which can be connected to the plug for suitable connection to earth ground. The ground wire may be, for example, a 12 gauge ground wire of suitable length.

The spiral-ribbed configuration of the inner surface of the chamber 18 is intended to create maximum turbulence, enabling all water passing through the chamber area to come in contact with the surface of the finned metallic alloy member 14 many times. The member 12 as depicted in FIGS. 1, 2 and 4 through 6 has a generally circular cross-section with an outer diameter less than the inner diameter of a cylinder drawn through the inner edges of the spiral ribs 30, thus providing an annular passageway between outer surface or edges of the member 14 and the ribs 30 (and the inner surface of the chamber 18).

Figure 4:
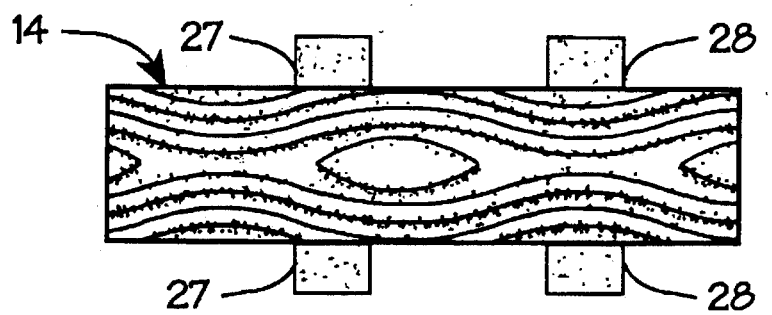
FIG. 4 is a side elevational view of the unitary member of the water conditioning apparatus of FIG. 1 separate from the housing.
Figure 5:
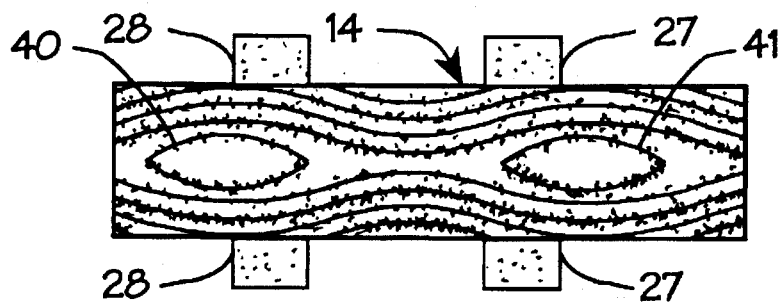
FIG. 5 is an opposite side elevational view of the unitary member of FIG. 4.

By reference to FIGS. 4 and 5 opposing sides are provided with two pair of opposing spacers 27 and 28, respectively. One pair of spacers 27 is further removed from the adjacent end of the member 14 that the other pair of spacers 27. The purpose of this is to mount the member 14 within the chamber 18 so that the member 14 is longitudinally displaced relative to longitudinal center of the chamber 18 providing a larger gap at the exit end or opening 22 that at the entrance opening 20. This unequal spacing enables the water flow toward opening 22 to have a larger volume portion for facilitating reverse flow in conjunction with the annular V-shaped return scoop 26 at the exit end. The four mounting or connecting spacers 27, 28 act as fluid flow diverter ribs in addition to increasing the interval turbulence, while having a basic purpose of securing the inner core so that it may remain in a centered axially offset suspension position.

Figure 6:
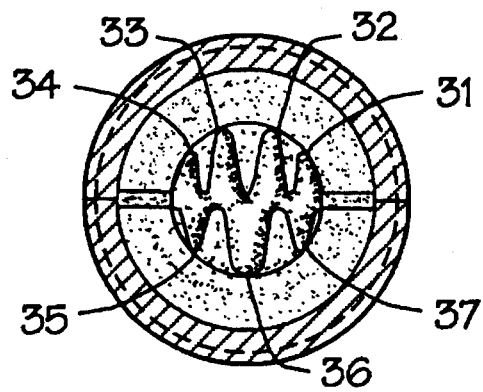
FIG. 6 is a cross-sectional view of the water conditioning apparatus of FIG. 1 as viewed generally along line 6—6 thereof.

The member 14 is provided with axially oriented undulate finned sections 31–36 formed thereon (See FIG. 6). As shown in side elevations in FIGS. 1 and 2 (also FIGS. 4 and 5), opposing sides are configured slightly differently, and that is with respect to placement of the airfoil configured side protrusions or foils 40–41. Foils 40 and 41 are shown in FIGS. 1 and 5 adjacent opposite ends of the member 14, with foil 42 on the diametrically opposite side occupying a position intermediate the two foils 40 and 41, that is at about the longitudinal center of the member 14. Undulate fin sections 31–36 extend the length of the member 14 and, with respect to opposite side views in FIGS. 1 and 2, are centrally disposed and symmetrical about the longitudinal centerline. Geometrically, the fin sections 3–36 are undulate, that is wave-shaped, or somewhat sinusoidally configured in side elevation, with the lower fin sections being in mirror image relation to the upper fin sections about the longitudinal centerline.

The foils 40–42 are positioned at a position which somewhat corresponds to the juncture of the maximum and minimum sinusoidal amplitudes of the undulate fin sections. It is to be noted that the axial position of foil 42 is approximately midway between the two foils 40, 41 on the opposite side.

With fluid passing from left to right as viewed in FIG. 1, fluid enters the entrance end opening 20 into the fore chamber portion, designated 18a (the volume between the opening 20 and the adjacent facing end of the member 14), from which the fluid flows through the openings between fin sections and into the annular passageway between the member 14 and the inner surface of the chamber 18 into contact with the ribs 30. As the fluid flows in the left to right direction, the fluid flows aerodynamically from the fore chamber, through the sinusoidally configured passages between fin sections, about the aerodynamically configured foils 40–42, into the exit chamber 18b and out the exit opening 22. However, simultaneously, there is another dynamic effect taking place as a consequence of the spiral ribs 30, resulting in a spiral sheet flow about the inner surface of the chamber 18 as a left-hand vortex flow. A third effect than comes into play, this third effect being caused by the annular V-shaped grooves or water return scoops 24 and 26. Exit scoop 26 causes a reverse flow of water coming into contact therewith, thereby forcing turbulence in the aft chamber 18b, while simultaneously turbulence is being created at the interface between the fluid flowing as a "sheet" at the ribs 30 and the water flowing through the end sections in an undulating manner.

A fourth effect is added to this and that being the interplay of the entering fluid between the entrance end of the member 14 and the return scoop 24 adjacent this end, that is within antechamber 18a. A fifth effect is occasioned by the diverting rib action of the mounting spacer 27 and 28, which lie in a common plane generally on a diameter of the chamber 18.

The combined effect of all of these effects is to create a "scrubbing" action and place the fluid in intimate contact with the metal alloy of the inner surface of the chamber 18 and the member 14, both of which are formed of the same composition. With fluid passing trough the chamber 18, mini venturi effects are created with the velocity of the main fluid flow decreasing while the pressure is increasing at various points, while at other points the reverse is true.

The housing 12 and the member 14 are each preferably cast in one piece of a suitable metal composition which is non-corrosive and non-contaminating for use in water systems, or the like. The housing 12 and member 14 are both cast, with a composition by weight, before heating, of 68% copper, 11% zinc, 10.5% nickel, 10% tin and 0.5% lead (the lead content, after heating and cooling, is reduced to about 0.0002%). In the casting process, the surface of the fins and foils is generally smooth to the naked eye, but, under a microscope can be seen to be abrasive for providing a "scrubbing" action during use.

In a conventional water system, such as from a municipal or other public water supply, little attention is paid to removal of minerals other than to acceptable levels of potability not injurious to public health. In some such water systems, the pipelines and conduits have been in place for tens or even hundreds of years, with a corresponding buildup of scale and deposits in the water mains before they get to the residence. Most, if not all, of these deposits are adhesive in nature and while not harmful for humans, they do have an adverse effect on the taste of the water, as well as a deleterious effect on the end use of the water for bathing or washing clothes. In some instances, these adhesive masses include decomposable substances which result in the creation of gas pockets, some of which are corrosive. With the configuration of the housing 12 and member 14, turbulence is created within the fluid flow to cause merging of bubbles of entrapped gas, to thereby create larger bubbles which are easily aerated, to cause soled particles to enter into colloidal suspension, and to break up adhesive masses.

Although the principle of operation is not totally understood, by viewing each side of the member 14 as having passages configured as sine wave, it can be seen that the "sine wave" of one passage (shown in FIG. 2) has twice the frequency of the "sine wave" of the other passage (shown in FIG. 1). By imagining these "sine waves" continuing down the conduit thereafter, it would appear that a combined effect would take place at a greater distance thereafter, where tow waves are traveling down the same tube in side by side relation, with the frequency of one wave being twice that of the other, with both waves passing through the low point of amplitude of velocity (or conversely pressure) at least once for every fluctuation of the lower frequency waveform.

Consequently, within the same length, the velocity of the fluid is fluctuating twice in the one passage for one fluctuation in the other passage, with the pressure at the point of exit of both passages into aft chamber 18b being generally equal. In addition with the ribs 30 and the fin sections and foil surfaces being microscopically "rough", microscopic particles are broken up with this scrubbing action. In addition, bubbles entering will be caused to merge creating larger bubbles for ease of aeration. Adhesive masses will be broken down into microscopic particles, and all of this will remain in suspension due to the turbulence create by the different venturi effects caused by the combined effects of the various parts on the fluid flow through the conditioner 10.

Figure 7:
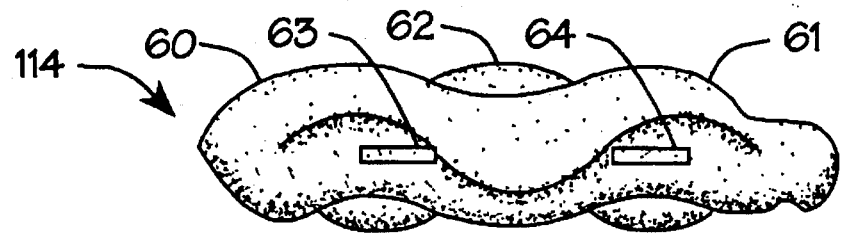
FIG. 7 is a side elevational view of an alternate embodiment of the unitary member for use in the water conditioning apparatus of FIG. 1 according to the invention, the opposite side thereof being identical.

Referring now to FIG. 7, there is shown an alternate embodiment of a fluid flow control member 114, in which the body in non-cylindrical, but has a configuration similar to the two "sine waves", wherein one lengthwise sine wave formed portion has first and second maximum amplitude portions or nodes 60 and 61, while an adjacent or central portion has a single maximum amplitude portion or node 62 intermediate nodes 60 and 62. The portion including node 62 would have on the opposite side thereof, another portion formed exactly like that shown in the foreground of FIG. 7. Side extending mounting spacers 63 are shown for mounting to the interior of housing 12, it being understood that these spacers would likewise be in aligned pairs. This configuration will also cause the combined turbulence effects previously described when placed within the chamber 18.

The coaction of the flowing water with the inner configuration of the housing member 12 and the members 14 or 114 creates maximum turbulence, enabling all water passing through the chamber 18 area to come in contact with the atomic surface of the unique alloy of the housing 12 and member 14 many times. In summary, initially the water will come into contact with the finned sections of the core member 14 which will scrub the water, create turbulence in the water and with the unique venturi effect permit all water passing through the chamber 18 to maintain pre-entry PSI within 10" of the exit opening 22 of the conditioner 10.

The curved internal flow control ribs 18 will divert the flowing water into a left hand vortex resulting in increased velocity of the water in the annular passageway. At the same time the return scoops 26 and 24 at each end of the chamber 18 area will direct ⅓ of all water entering the chamber 18 to reverse the flow and cause a maximum mixing of all water in the chamber area. The inner core venturi action, coupled with the curved flow control ribs 30 and return scoops, activated further by the flow diverter mounting spacers 27, 28, will result in maximum conditioning of all water passing through the unit at either high or low volumes, ie.: 25/30 PSI to 120 PSI and above.

While there have been shown and described preferred embodiments, it is to be understood that various other modification may be made within the spirit and scope of the invention. The member 12, 13 and 114, in accordance with the invention may be fabricated by means other than casting, and may have any diameter, the diameters set forth herein being for illustrative purposes and not intended to be limiting factors. The members may be constructed to accommodate different fluid flow rates from 200 gallons per minute to 36,000 gallons per minute with excellent results in residential, commercial, industrial and solar applications resulting in significant cost savings due to the minimization of elimination of corrosive activity in the conduits or mains. The venturi means heretofore illustrated and described are examples of configurations which may be readily employed, but others may be devised consistent with the invention herein described.

I claim:

1. An apparatus for preventing scale formation in systems wherein a fluid is conducted through a fluid delivery system, the combination comprising:

a housing configured for connection in fluid flow with said system and having an inner chamber with a generally cylindrical surface and an entrance end opening and an exit end opening, diameters of said openings being less than the diameter of said inner chamber;

flow control rib means formed on said inner surface;

a longitudinally extending unitary imperforate generally metallic member having a turbulence creating surface and diameter less than the diameter of said inner chamber and greater than the diameter of said openings;

means for supporting said unitary member in said chamber in coaxial alignment with said inner surface and spaced from said entrance and exit openings; and fluid feedback means formed within said chamber adjacent at least one of said exit opening or said entrance opening for causing water flowing through said conduit to at least partially reverse itself for causing greater turbulence than that caused by said rib means and the surface of said unitary member to thereby prevent the formation of scale in the fluid delivery system.

2. The apparatus of claim 1 wherein said turbulence creating surface includes a plurality of fin sections extending in the axial direction of said turbulence creating surface for the length of said surface.

3. The apparatus according to claim 2 wherein said fin sections are of an undulate form.

4. The apparatus according to claim 3 wherein the surface of said unitary member includes foil means at spaced locations interspersed in said fin sections.

5. The apparatus according to claim 1 wherein said flow control rib means include spirally oriented rib means.

6. The apparatus according to claim 5 wherein said ribs are in the form of a continuous spiral extended inwardly of said chamber from said inner chamber surface, configured and positioned to provide a left-hand vortex to said fluid.

7. The apparatus according to claim 6 wherein said turbulence creating surface includes fin sections extending in the axial direction of said turbulence creating surface.

8. The apparatus according to claim 7 wherein the inner ends of said ribs are in proximate relation and spaced from the outer ends of said fin sections.

9. The apparatus according to claim 5 wherein the direction of said spirally oriented ribs is such to create a counterclockwise vortex in the fluid stream as viewed from the entrance end.

10. The apparatus according to claim 1 wherein said fluid feedback means include an annular groove formed about said at least one of said exit opening or said entrance opening on the interior of said chamber.

11. The apparatus according to claim 10 wherein said annular groove is generally V-shaped and is formed about both of said exit opening and said entrance opening to thereby provide fluid equalization at said exit opening and said entrance opening.

12. The apparatus according to claim 1 wherein said unitary member is configured to provide a greater spacing distance at said exit end opening than said entrance end opening.

13. The apparatus of claim 1 wherein the composition of said housing and said unitary member are the same in metallic composition to thereby substantially eliminate electrochemical reaction between said housing and said unitary member.

14. The apparatus of claim 13 wherein said composition is formed essentially of copper.

15. The apparatus of claim 14 wherein said composition is formed substantially of copper, zinc, nickel and tin.

16. The apparatus of claim 15 wherein said housing and said unitary member are the same in metallic composition, which in weight percentage is substantially 68% copper, 11% zinc, 10.5% nickel and 10% tin.

17. The apparatus according to claim 1 wherein said flow control means includes continuous spirally oriented rib means directed from said surface into said inner chamber.

18. The apparatus according to claim 17 wherein the inner ends of said rib means are in proximate relation and spaced from the outer ends of said fin sections.

19. The apparatus according to claim 17 wherein the direction of said spirally oriented ribs is such to create a counterclockwise vortex in the fluid stream as viewed from the entrance end.

20. Apparatus for preventing scale formation in systems wherein a fluid is conducted through a fluid delivery system, the combination comprising:

a housing configured for connection in fluid flow relation with said system and having a chamber with a generally cylindrical inner surface and an entrance end opening and an exit end opening;

flow control means formed on said inner surface;

a longitudinally extending unitary imperforate generally metallic member having a turbulence creating surface and a diameter less than the diameter of said inner chamber surface and greater than the diameter of said openings;

means for supporting said unitary member in coaxial alignment with said inner surface within said chamber; and fluid feedback means formed within said chamber adjacent to and formed around at least one of said openings for causing water flowing through said chamber to at least partially reverse itself for causing greater turbulence than that caused by said rib means and the surface of said unitary member whereby to prevent the formation of scale in the fluid delivery system.

21. The apparatus of claim 20 wherein said turbulence creating surface includes fin sections extending in the axial direction of said turbulence, and wherein said fin sections are formed of a plurality of fins having an undulate form.

22. The apparatus according to claim 21 wherein the surface of said unitary member includes foil means interspersed approximately at the juncture of the maximum and minimum sinusoidal amplitudes of said fin sections.

23. The apparatus according to claim 20 wherein said spirally oriented rib means are formed through a length of the inner surface generally equal to the length of said unitary member.

24. The apparatus according to claim 18 wherein said means formed within said chamber for causing water flowing through said chamber to at least partially reverse itself include an annular generally V-shaped groove formed within the chamber about each of said openings.

25. The apparatus according to claim 20 wherein said unitary member has an axial dimension less than the axial dimension of the interior of said chamber and wherein said unitary member is spaced from said entrance and exit openings within said conduit.

26. The apparatus according to claim 25 wherein the spacing of said unitary member is such that there is a greater spacing distance at said exit end opening than said entrance end opening.

27. The apparatus of claim 18 wherein said housing and said unitary member are formed of the same metallic composition.

28. The apparatus of claim 27 wherein said housing and said unitary member are formed essentially of copper with lead minimized to less than 1.0% by weight.

29. The apparatus of claim 27 wherein said composition is formed substantially of copper, zinc, nickel and tin.

30. The apparatus according to claim 29 wherein the composition is in weight percentage substantially 68% copper, 11% zinc, 10.5% nickel and 10% tin.

31. The apparatus according to claim 18 wherein said housing inner surface and said unitary member are configured, dimensioned and arranged to provide an annular fluid flow passage therebetween and wherein the axial length of said unitary member is less than the length of said chamber and is supported therein with a spacing from the exit end opening greater than the spacing from the entrance end opening.

* * * * *